Sept. 23, 1952        F. R. STEEL        2,611,205
FISHING LURE
Filed April 14, 1949
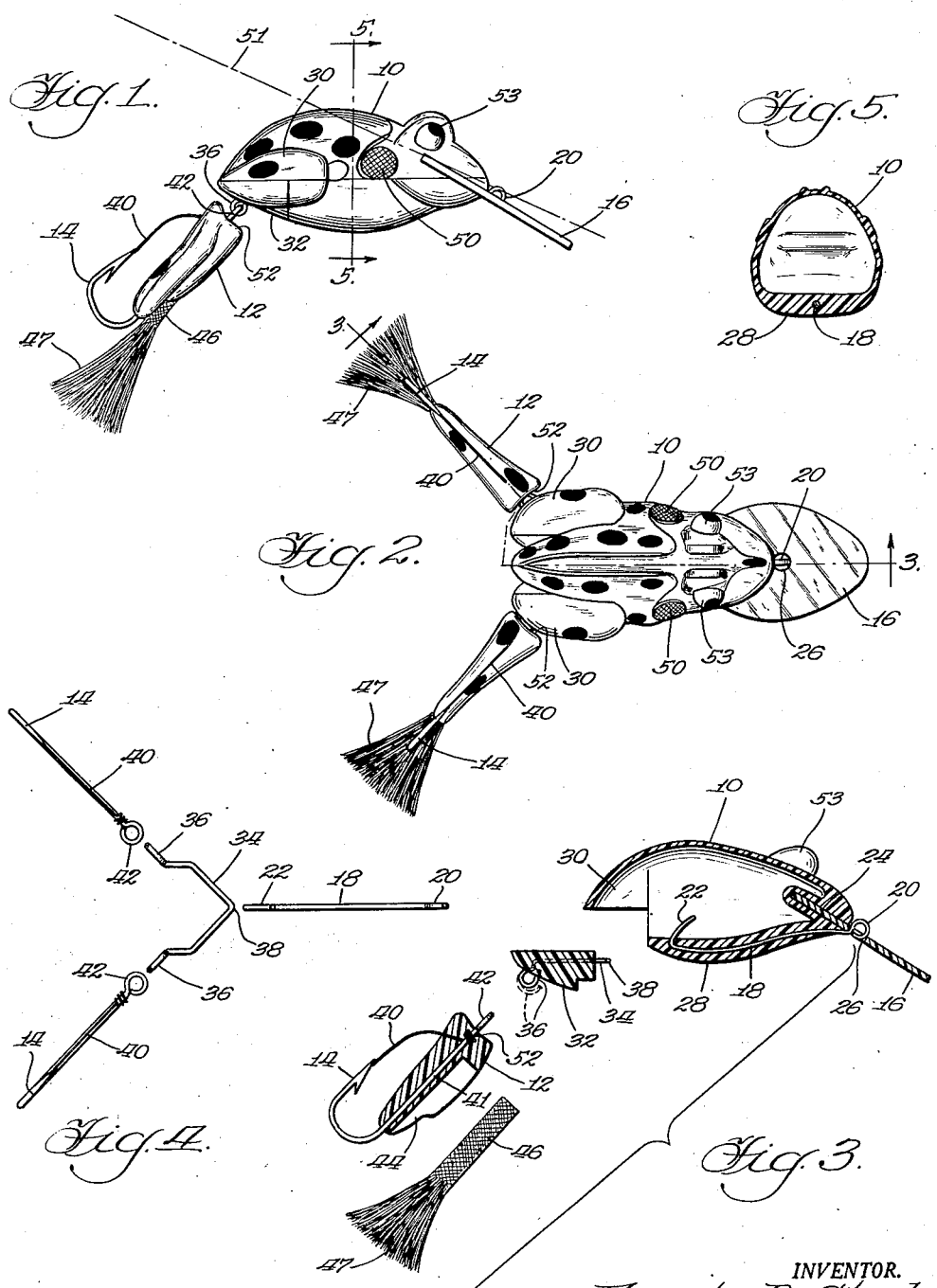
INVENTOR.
Frank R. Steel
BY
Donald H. Sweet
Atty.

Patented Sept. 23, 1952

2,611,205

UNITED STATES PATENT OFFICE 2,611,205

FISHING LURE

Frank R. Steel, Wilmette, Ill.

Application April 14, 1949, Serial No. 87,550

14 Claims. (Cl. 43—42.3)

My invention relates to fishing and includes among its objects and advantages an artificial lure of increased effectiveness in prolonging the illusion or deception of the fish.

In the accompanying drawing,

Figure 1 is a side elevation of a lure according to the invention;

Figure 2 is a top plan view of the same;

Figure 3 is a disjointed view with the body and leg in section as on line 3—3 in Figure 2:

Figure 4 is a disjointed plan view of the wire harness; and

Figure 5 is a section on line 5—5 of Figure 1.

In the embodiment of the invention selected for illustration, the lure comprises four parts. The body 10 and legs 12 are formed of green flexible plastic. The hooks 14 are conventional and the wobble plane 16 is a bit of transparent plastic sheet.

Mechanical strength under load is provided by the wire harness best illustrated in Figure 4. The reach 18 is imbedded in the bottom of the body 10 and carries a front eye 20 for the attachment of a line, and a rear hook 22. The body is molded in place in a mold which already contains the wobble plane 16 and the reach 18 so that the finished product has the plane 16 firmly cemented in the slot 24 and the reach imbedded in the body as shown.

The body 10 has a relatively thick bottom portion 28, which includes the protuberances at 30, simulating the upper thigh joint of the leg of a frog, while the rest of the body is much thinner. This distribution of weight, combined with the body contour shown in the drawings, is such that when the body floats in water, the center of bouyancy is always spaced a substantial distance away from the center of gravity, and substantially vertically above the center of gravity, when the body is right side up. Accordingly, except with the body flat on its back, there is always a strong turning moment, tending to right the body. And in that position there is a maximum of instability such that any displacement immediately produces a turning moment.

The body is originally made with an opening at the bottom along the back extending all the way across, which opening is subsequently closed by the closure 32, and is of the same green plastic as the body. Imbedded in the closure 32 is the harness bridge 34, which has a central bight at 38 adapted to be slipped over the hook 22. The bridge is substantially V-shaped and the ends of the V are turned down and then vertically to define U-shaped hooks 36 lying substantially in the vertical planes of the legs, when the legs are in the position of Figure 2.

Each leg 12 is built up on one of the hooks 14, being molded around the shank 41 of the hook, which shank has its front end formed into the leg eye 42, which is in a plane perpendicular to the plane of the hook 14. The hook and leg assembly includes a weed guard 40 of relatively fine flexible wire, wrapped around the shank 41 back of the eye 42 tightly enough to hold it in place during the casting of the plastic and, in the finished assembly, held in place by its engagement with the shank and with the plastic.

In each leg I cut a foot slot 44, in which I place the foot 46, which is a bit of white braided tape unravelled at its rear end to form a brush-like structure 47. The woven portion is laid in the slot and cemented in place.

It is emphasized that, as shown in the drawing, when viewed in the vertical plane, the legs 12 are free to oscillate about 45° in either direction from the position of Figure 2. Viewed in side elevation, as in Figure 1, they are free to move about 45° in either direction, from a position extending back substantially horizontal to a position hanging vertically down.

Due to the weight distribution of the main body and the additional weight of the legs, such a lure lies at rest in smooth water with the water level along the dash line 51, with just the eyes 53 and a bit of the body back of the eyes protruding above the surface of the water. In this position, a pull on the line will give the body a very slight initial lift in the water as it starts working its way down, due to the pull of the wobble plane. At normal trolling speed, it has three types of motion, as follows:

*First.*—The main body travels a sinusoidal path not unlike that defined by a snake swimming through the water, and this body wobble causes the legs to trail at different angles.

*Second.*—The eddy currents back of the legs 12 cause the brushes 47 to quiver in a very lifelike way.

*Third.*—The eddy currents around the body impinge on the legs and tend to make them quiver a little. This action is enhanced by the slight concavity of the front end of the leg, encircled by the raised annulus 52. The primary purpose of the annulus 52 is to limit the swinging of the leg, leaving it free to swing or quiver within the positions which such legs normally assume, but preventing it from getting into positions where it would tangle with the other leg or get caught in an abnormal position.

It is well known that a game fish in making a strike on a frog will attack from a position slightly below and to the side of the main body, and from the rear of the bait. The hooks 14, due to the angles they form with the main body portion and to their independent wobble motion, are positioned in the center of the area of attack for maximum effectiveness. A fish's eating habits are such that it generally takes what might be termed a sample nibble on anything that it believes edible. If it finds, taking that nibble, that the object is hard, it will take no further interest in that object or, if it has it in its mouth, it will attempt to regurgitate, to rid itself of the undesired article.

With the present lure, as the fish makes its attack, it will bite into the soft material, which will yield to the closing action of the fish's jaw, thus giving additional time for the hook to be taken into the fleshy part at the rear of the fish's mouth, before the fish discovers its error. And during this same critical fraction of a second, the legs 12 and feet 47 tend to move around in the fish's mouth and tickle his gullet almost exactly as the legs and feet of a real frog would. Both these actions delay the awareness of the fish of the need to rid himself of the lure, and may even cause him to swallow the hook.

In the assembly of this lure, the body is molded so as to form an integral unit with the reach 18 and the plane 16. The body closure 32 is molded about the harness bridge, as described. The body closure 32 is affixed to the body 10 by slipping the bight 38 of the bridge 34 over the hook 22 and by crimping the hook 22 down around the bight 38. This is very easily accomplished due to the fact that the body 10 is very flexible and can be distended to accomplish this crimping with a long-nosed pliers. The legs 12 are assembled as hereinbefore described. In affixing the legs 12 to the body closure 32, the body leg eyes 36 are opened with a pliers to the dotted line position shown in Figure 3, and the leg eyes 42 are slipped over the wire forming the body leg eyes 36. The body leg eye 36 is then closed by bending it back to its original position, as shown in solid lines in Figure 3.

The bottom belly portion of the body 10, body closure 32, and legs 12 are then painted white. The plastic portions of the body, as previously pointed out, are green. Brown paint is then applied at various spots to the upper portions of the body and legs, so as to duplicate the natural coloring of a frog. Simulated gills are formed at 50.

The best plastic I know of at present for getting such bodies that will retain their yieldable properties for a long time without deterioration, is Vinylite. When the plastic parts are of Vinylite an excellent cement for the closure 32 and the feet 46, is a mixture of methylethyl ketone and cyclohexanone, thickened with very small Vinylite particles. This results in a union in which the cement itself polymerizes into Vinylite.

The resulting assembly is an artificial frog so lifelike that when it lies still in the water a large fish might easily be deceived into a hard strike. In starting forward from a position of rest, as in Figure 1, the body 10 is tilted enough to overpower the diving vane 16 momentarily, and will rise about half out of the water. But as soon as the forward movement has swung the legs 12 up and almost horizontal, and they pull back instead of down on the body, the body 10 noses over and the diving vane 16 gets a better purchase and pulls the body under again and keeps it under as long as the forward movement continues. This little initial rise mimics with uncanny faithfulness the antics of a live frog in fear of an attack from below.

Seen moving through the water at a fair speed, the device does not move like a frog, but at such speeds the physical conditions are such that a striking fish does not have time to see the shape of the object in detail. The sinusoidal movement described is well known to be one of the most effective for inciting fish to make an attack.

Trolled on a long line, the particular shape shown works down gradually to a depth of a foot or so, all the time continuing its side-to-side wobble.

In all positions and at all speeds, the diving plane 16 is substantially invisible to the fish because of its transparency. In water where the fish have learned to be wary of the shapes presented by baits having an opaque diving vane in front of the body, the superiority of the transparent diving vane is most noticeable.

Others may readily adapt the invention for use under various conditions of service by employing one or more of the novel features involved, or equivalents thereof. As at present advised with respect to the apparent scope of my invention, I desire to claim the following subject matter:

1. A lure comprising, in combination: a hollow plastic body simulating the body shape of a natural prey of fish; said body being yieldable under the bite of the fish to an extent not markedly different from the prey simulated; said body having a relatively thick wall portion in a position corresponding to the belly, or body bottom, of the natural prey; said body having a water displacement contour such that, in all positions in the water, the center of buoyancy is offset from the center of gravity in a direction to turn the entire lure with its thick wall portion facing down; a diving and wobble plane projecting forwardly and downwardly from the front end of said body; simulated legs of plastic; double-eye connections connecting said legs to said body; means for limiting the pivotal movement of said legs, permitting movement in a horizontal plane only to about 45 degrees in either direction from a converging vertical plane inclined in toward the axis at 45 degrees, and in the vertical plane permitting movement in either direction to about 45 degrees from a direction inclined about 45 degrees downward, whereby in casting, said legs do not get into position engaging each other, or so oriented as to interfere with the righting of said body; and a harness reinforcing said body; said harness including two hooks; the shank of each hook lying along the axis of one of said legs and terminating forwardly in one of the eyes of said double-eye connection; the hook portion of each hook lying in a plane perpendicular to its eye; a V-shaped bridge embedded in the body; the bight of said V being foremost and the ends of said V defining the body eyes of said double-eye connections; and a reach having its main portion embedded in said body bottom; the rear end of said reach having a terminal portion interlinking the bight of said bridge; the front end of said reach having a terminal line eye extending out of said body for a line attachment; said wobble plane having a central opening adjacent said body; said line eye lying in said opening.

2. A lure comprising, in combination: a hollow yielding plastic body simulating the body shape of a natural prey of fish; said body being yieldable under the bite of the fish to an extent not markedly different from the prey simulated; said body having a relatively thick wall portion in a position corresponding to the belly, or body bottom, of the natural prey; simulated legs; double-eye connections connecting said legs to said body; and a harness reinforcing said body; said harness including two hooks; the shank of each hook lying along the axis of one of said legs and terminating forwardly in one of the eyes of said double-eye connection; a V-shaped bridge embedded in the body; the bight of said V being foremost and the ends of said V defining the body eyes of said double-eye connections; and a reach having its main portion embedded in said body bottom; the rear end of said reach having a terminal portion interlinking the bight of said bridge; the front end of said reach having a terminal line eye extending out of said body for a line attachment.

3. A lure comprising, in combination: a hollow yielding plastic body simulating the body shape of a natural prey of fish; said body being yieldable under the bite of the fish to an extent not markedly different from the prey simulated; said body having a relatively thick wall portion in a position corresponding to the belly, or body bottom, of the natural prey; simulated legs; double-eye connections connecting said legs to said body; and a harness reinforcing said body; said harness including two hooks; the shank of each hook lying along the axis of one of said legs and terminating forwardly in one of the eyes of said double-eye connection; and a V-shaped bridge embedded in the body; the bight of said V being foremost and the ends of said V defining the body eyes of said double-eye connections.

4. A lure comprising, in combination: a buoyant body shaped to simulate a natural prey; a transparent diving and wobble plane rigid with said body and extending forwardly and downwardly from the front end of said body; simulated legs, heavier than water, articulated to the rear end of said body on either side of the vertical central plane thereof for limited pivotal movement in many planes; said legs being heavy enough to tilt said body, when floating at reast, to such an extent that an initial forward displacement causes said body to rise until said legs have been deflected rearwardly to permit said body to nose over and dive; and hook means operatively connected to said legs.

5. A lure comprising, in combination: a buoyant body shaped to simulate a natural prey; a transparent diving and wobble plane rigid with said body and extending forwardly and downwardly from the front end of said body; means heavier than water, articulated to the rear end of said body for limited pivotal movement in many planes, and heavy enough to tilt said body, when floating at rest, to such an extent that an initial forward displacement causes said body to rise until said tilting means has been deflected rearwardly to permit said body to nose over and dive; and hook means operatively connected to said body.

6. A lure comprising, in combination: a buoyant body having a wide rear end with rounded corners; and an appendage fastened on each rear corner; each appendage being separately connected to said body; each connection comprising two interengaged eyelets projecting from said body and appendage; the body eyelet lying in a vertical plane at an outward angle of about 45 degrees to the body axis, and in said plane extending outward rearwardly and downwardly, pointed at an angle of about 45 degrees downward with respect to the median plane of the body; each appendage including a hook; the appendage eyelet and hook lying in planes at right angles to each other; each appendage having projections positioned to engage the adjacent body and limit the pivotal movement of the appendage to a deflection of about 45 degrees deviation in all directions from a prolongation of the direction in which the body eyelet is pointed; the center of gravity of the entirety being so located that the quiescent body floats pointed upwardly and forwardly with the appendages pointing directly down; and a transparent diving vane projecting forwardly beyond the front of said body, whereby the quiescent body, when displaced, first jumps and then dives.

7. A lure comprising, in combination: a buoyant body having a wide rear end with rounded corners; and an appendage fastened on each rear corner; each appendage being separately connected to said body; each connection comprising two interengaged eyelets projecting from said body and appendage; the body eyelet lying in a vertical plane at an outward angle of about 45 degrees to the body axis, and in said plane extending outward rearwardly and downwardly, pointed at an angle of about 45 degrees downward with respect to the median plane of the body; each appendage including a hook; the center of gravity of the entirety being so located that the quiescent body floats pointed upwardly and forwardly; and a diving vane at the front end of said body, whereby the quiescent body, when displaced, first jumps and then dives.

8. A lure comprising, in combination: a soft buoyant resilient yielding body devoid of hooks; symmetrical duplicate attachment means laterally offset on either side of the vertical median plane of said body and projecting downwardly and rearwardly and laterally from said body near the rear end thereof; and a single-barb hook articulated into each attachment means for universal pivotal movement; whereby a fish biting on the body has the loose hooks dangling in or near its gullet.

9. A lure comprising, in combination: a resilient yielding body devoid of hooks; attachment means laterally offset on either side of the vertical median plane of said body and projecting from said body near the rear end thereof; and a single-barb hook articulated into each attachment means for universal pivotal movement; whereby a fish biting on the body has the loose hooks dangling in or near its gullet.

10. A lure comprising, in combination: a pliable main body having a longitudinal axis; a hook having an eyelet at one end thereof; a body eyelet integrally fastened in said body and extending out of said body; said body eyelet lying in a plane normal to the body surface adjacent said eyelet; said hook and body eyelets passing through each other; the interengagement of said eyelets constituting the sole attachment between said hook and said body, whereby said hook dangles freely and can pivot around said first eyelet in many directions; and stop means carried by said hook and said body to engage each other and limit the pivotal movement of said hook whenever said hook rotates more than about 45° out of alignment with a line extending away from said body eyelet normal to the body surface adjacent said body eyelet; a connection located on the body axis at one end of said body for pulling said body through the water; said body eyelet being remote from said pulling connection and near the opposite end of said body; the body surface adjacent said body eyelet lying in an inclined plane such that the line with respect to which hook rotation is limited extends downwardly and away from said body at an angle of about 45° to the horizontal when said body axis is horizontal, and at a lateral angle of about 45° to a vertical plane lying in the direction of pull.

11. A lure comprising, in combination: a pliable main body having a longitudinal axis; a hook having an eyelet at one end thereof; a body eyelet integrally fastened in said body and extending out of said body; said body eyelet lying in a plane normal to the body surface adjacent said eyelet; said hook and body eyelets passing through each other; the interengagement of said eyelets constituting the sole attachment between said hook and said body, whereby said hook dangles freely and can pivot around said first eyelet in many directions; and stop means carried by said hook and said body to engage each other and limit the pivotal movement of said hook whenever said hook rotates more than about 45° out of alignment with a line extending away from said body eyelet normal to the body surface adjacent said body eyelet; a connection located on the body axis at one end of said body for pulling said body through the water; said body eyelet being remote from said pulling connection and near the opposite end of said body; the body surface adjacent said body eyelet lying in an inclined plane such that the line with respect to which hook rotation is limited extends downwardly and away from said body at an angle of about 45° to the horizontal when said body axis is horizontal.

12. A lure according to claim 11 in which the stop means carried by said hook is a relatively small body portion shaped to simulate a leg for the main body.

13. A lure according to claim 11 in which said body has portions at its rear end offset on both sides of the body axis; said hook being positioned on one of said offset portions; and a duplicate hook on the other offset body portion.

14. A lure according to claim 13 in which the stop means carried by said hooks are relatively small bodies shaped to simulate legs for the main body.

FRANK R. STEEL.

REFERENCES CITED

The following references are of record in the file of this patent:

UNITED STATES PATENTS

| Number | Name | Date |
|---|---|---|
| Re. 18,390 | Welch | Mar. 22, 1932 |
| 534,506 | Hastings | Feb. 19, 1895 |
| 882,344 | Rhodes | Mar. 17, 1908 |
| 1,102,312 | Winnie | July 7, 1914 |
| 1,689,541 | Welch | Oct. 30, 1928 |
| 1,881,947 | Rawdon | Oct. 11, 1932 |
| 1,927,441 | Korte | Sept. 19, 1933 |
| 2,047,763 | Christiansen | July 14, 1936 |
| 2,106,755 | McArthur | Feb. 1, 1938 |
| 2,158,037 | Pflueger | May 9, 1939 |
| 2,217,677 | George | Oct. 15, 1940 |
| 2,250,478 | Franks | July 29, 1941 |